(12) United States Patent
Price et al.

(10) Patent No.: US 7,218,541 B2
(45) Date of Patent: May 15, 2007

(54) HIGH EFFICIENCY TWO STAGE INVERTER

(75) Inventors: Erin L. Price, Pflugerville, TX (US); Brent A. McDonald, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 10/896,265

(22) Filed: Jul. 21, 2004

(65) Prior Publication Data

US 2006/0018132 A1     Jan. 26, 2006

(51) Int. Cl.
*H02M 7/538*     (2006.01)
(52) U.S. Cl. .................... 363/134; 363/24; 315/219
(58) Field of Classification Search ............... 315/307, 315/291, 283, 106, 297, 290, 224, 219, 225, 315/308, 324; 363/132, 131, 15, 34, 16, 363/37, 123; 323/222, 285
See application file for complete search history.

(56) References Cited

U.S. PATENT DOCUMENTS

| | | | |
|---|---|---|---|
| 5,420,779 A | 5/1995 | Payne | |
| 5,430,641 A | 7/1995 | Kates | |
| 5,854,617 A * | 12/1998 | Lee et al. | ................... 345/102 |
| 6,108,215 A | 8/2000 | Kates et al. | |
| 6,130,509 A | 10/2000 | Kates et al. | |
| 6,344,986 B1 * | 2/2002 | Jain et al. | ..................... 363/89 |
| 6,452,344 B1 * | 9/2002 | MacAdam et al. | ......... 315/307 |
| 6,876,157 B2 * | 4/2005 | Henry | ........................ 315/219 |

\* cited by examiner

*Primary Examiner*—Rajnikant B. Patel
(74) *Attorney, Agent, or Firm*—Haynes and Boone, LLP

(57) ABSTRACT

In a two stage inverter providing power to a load, a first stage component is operable to receive a first voltage input and a first control input to generate a first voltage output, which is higher than the first voltage input. The first control input is indicative of the power provided to the load. The first voltage output varies in response to a change in the first voltage input by a predefined function. A second stage component of the inverter is operable to receive the first voltage output and a second control input to generate the power as an output. The second control input is indicative of the power provided to the load. A controller component of the inverter is operable to receive a feedback input indicative of the power required by the load and generates the first and second control inputs.

15 Claims, 3 Drawing Sheets

HIGH EFFICIENCY TWO STAGE INVERTER

BACKGROUND

The present disclosure relates generally to the field of power supplies for information handling systems, and more particularly to techniques for efficiently providing power to drive a discharge lamp, such as a cold cathode fluorescent lamp (CCFL).

As the value and use of information continues to increase, individuals and businesses seek additional ways to acquire, process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Liquid crystal display (LCD) panel based display devices have been commonly utilized in many IHS systems due to their compact size, and low power consumption. Although there are different types of backlights (e.g., light sources including a discharge lamp), which are currently used for backlighting the latest LCD panels, the CCFL (also known as cold cathode fluorescent tube (CCFT)) is most commonly used. Circuits for supplying power to CCFL's generally require a controllable alternating current (AC) power supply and a feedback loop to accurately monitor the current in the lamp in order to maintain operating stability of the circuit and to have an ability to vary the lamp brightness. Such circuits typically generate a high voltage to initially turn on the CCFL and then lower the voltage when current begins to flow through the lamp.

Such circuits also typically include an inverter circuit to convert a direct current (DC) voltage received as an input to a regulated AC current generated as an output. Inverter circuits typically include a controller component, such as a pulse width modulator (PWM) based controller. Various well-known inverter circuit configurations or "topologies" include a Royeroscillator, full-bridge or half-bridge inverters.

The CCFL power consumption may account for a significant portion (e.g., up to 50% in some cases) of the IHS system power requirement, especially for portable systems. Therefore, there is a considerable amount of interest to achieve advantages in extending battery life and reducing re-charge frequency by improving the efficiency of power supplies configured to provide power to the CCFL.

Traditional inverter circuits may use a single stage or two stage inverter. FIG. 1 illustrates a block diagram for a commercially available two stage inverter 100, such as model 1NVC638 LCD backlight inverter manufactured by Hitachi Media Electronics. In such inverters, the output of a first stage DC—DC booster, which is provided as an input to a second stage inverter, is held substantially constant. The second stage includes a resonant push-pull inverter. The traditional two stage inverter regulates the output (current provided to the CCFL load) by varying the duty cycle to the first stage. The second stage operates at a fixed frequency and duty cycle, independently of the first stage duty cycle.

Presently, many single stage and two stage inverters do not maintain high efficiency over wide variations in input voltage. In traditional inverter based power circuits, a wider input voltage range, and/or a larger difference between the input and output voltages typically causes a decrease in power conversion efficiency.

Historically, the battery cell stacks and cell technology have determined the range of input voltage provided to the first stage. Presently, a voltage range for battery cell stacks working in combination with AC/DC adaptors typically varies from 9V–22V. With the trend towards lowering battery cell stack voltages, in the near term, maturing battery technology may extend this range to 6V–22V. Further advances in battery technology may cause the low end of the voltage range to drop even further. This typically results in generating more heat in the inverter thereby reducing battery run time.

Therefore, a need exists for improved efficiency of the power circuits providing power to the CCFL. More specifically, a need exists to develop tools and techniques for improving the efficiency of inverters under changing input voltage. Accordingly, it would be desirable to provide tools and techniques for an improved inverter of an IHS absent the disadvantages found in the prior methods discussed above.

SUMMARY

The foregoing need is addressed by the teachings of the present disclosure, which relates to an improved two stage inverter of an IHS. According to one embodiment, a first stage component is operable to receive a first voltage input and a first control input to generate a first voltage output, which is higher than the first voltage input. The first control input is indicative of the power provided to the load. The first voltage output varies in response to a change in the first voltage input by a predefined function. A second stage component of the inverter is operable to receive the first voltage output and a second control input to generate the power as an output. The second control input is indicative of the power provided to the load. A controller component of the inverter is operable to receive a feedback input indicative of the power required by the load and generates the first and second control inputs.

The embodiments advantageously provide for an improved two stage inverter, because a first stage of the inverter includes a variable boost voltage output mechanism to advantageously accommodate DC input voltages having a wider range and a second stage of the inverter includes a control signal to adjust the duty cycle. Thus, the overall efficiency of the two stage inverter is advantageously improved by varying the boost voltage output and adjusting a duty cycle of a second stage of the inverter.

DETAILED DESCRIPTION

Novel features believed characteristic of the present disclosure are set forth in the appended claims. The disclosure itself, however, as well as a preferred mode of use, various objectives and advantages thereof, will best be understood by reference to the following detailed description of an illustrative embodiment when read in conjunction with the accompanying drawings. The functionality of various circuits, devices or components described herein may be implemented as hardware (including discrete components, integrated circuits and systems-on-a-chip), firmware (including application specific integrated circuits and programmable chips) and/or software or a combination thereof, depending on the application requirements.

Receiving a wider range of DC input voltage, as well as changes in the input voltage, causes a loss of power conversion for the traditional two stage inverter circuits. This generates more heat and causes a reduced battery run time. It would be desirable to improve the efficiency of two stage inverters operating under a wider range of voltage inputs and changing voltage conditions. The problem of degraded efficiency under varying DC voltage input having a wider range is advantageously improved by adding a second feedback control loop to the two stage inverter. This technique improves power conversion efficiency over a wider range of changing DC input voltages.

According to one embodiment, in a method and system for an improved two stage inverter providing power to a load, a first stage component is operable to receive a first voltage input and a first control input to generate a first voltage output, which is higher than the first voltage input. The first control input is indicative of the power provided to the load. The first voltage output varies in response to a change in the first voltage input by a predefined function. A second stage component of the inverter is operable to receive the first voltage output and a second control input to generate the power as an output. The second control input is indicative of the power provided to the load. A controller component of the inverter is operable to receive a feedback input indicative of the power required by the load and generates the first and second control inputs.

Figure 1:
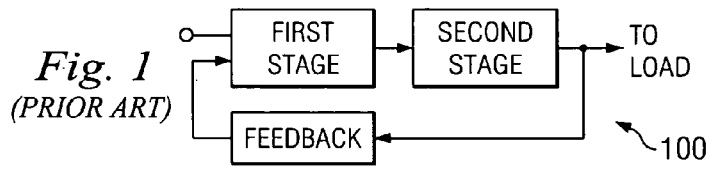
FIG. 1 described hereinabove, illustrates a block diagram for a commercially available two stage inverter, according to prior art.
Figure 2:
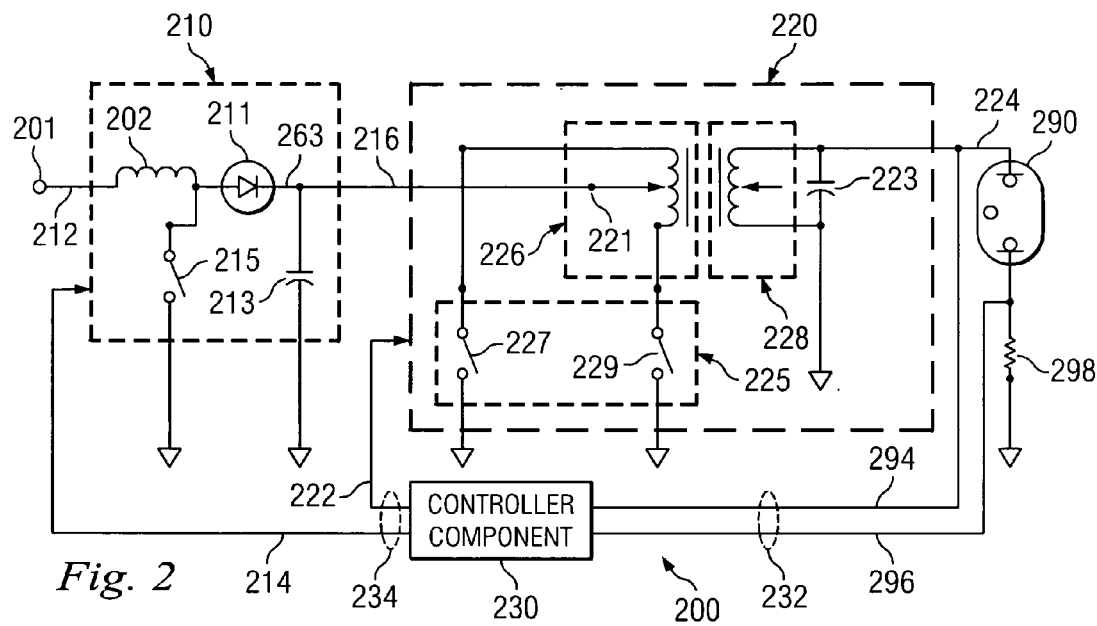
FIG. 2 illustrates a schematic diagram for an improved two stage inverter for providing power to a load, according to an embodiment.

FIG. 2 illustrates a schematic diagram for an improved two stage inverter 200 providing power to a load 290, according to one embodiment. In the depicted embodiment, the two stage inverter 200 includes the following components: a) a first stage component 210, b) a second stage component 220 coupled to the first stage component 210 in a cascade arrangement, and c) a controller component 230. In this embodiment, the first stage component 210 is a DC—DC boost converter and the second stage component 220 is a resonant push-pull DC-AC inverter.

In one embodiment, the first stage component 210 receives a first voltage input 212 and a first control input 214 and generates a first voltage output 216, which is greater than the first voltage input 212. The first control input 214, which is generated by the controller component 230, is indicative of the power provided to the load 290. The value of the first voltage input 212 depends on the power source (PWR_SRC) 201 selected and may vary between a battery voltage (approximately between 6V and 17V) and an AC adapter voltage (approximately between 18V and 22V). The value of a current drawn from the power source 201 is dependent on the power required by the load 290.

As described earlier, the first stage component 210 is a DC—DC boost converter. In one embodiment, the DC—DC boost converter includes an inductor 202 coupled in series with a diode device 211 charging a first capacitor 213. The first voltage input 212, which is received as input to the first stage component 210, is switched by a first switch 215, which is controlled by the first control input 214 generated by the controller component 230. The first control input 214 adjusts a duty cycle of the first stage component 210 to vary the first voltage output 216, in response to the power required by the load 290.

In one embodiment, the first voltage output 216 is variable and varies in response to a change in the first voltage input 212 by a predefined function. That is, the relationship between Y=the first voltage output 216 and X=the first voltage input 212 is defined by an equation 100:

$$Y = f(X) \qquad \text{Equation 100}$$

where f is a predefined function.

In one embodiment, the equation 100 is represented by the following predefined function:

$$Y = V_{start} + (X - X_{min}) * \text{Constant} \qquad \text{Equation 110}$$

where $V_{start}$ is a starting or an initial value for the first voltage input 212, $X_{min}$ defines the minimum voltage value for the first voltage input 212 such as 6V, and constant defines a gain factor associated with the first stage component 210. The predefined function computes a difference between the first voltage input 212 and a minimum voltage value of the first voltage input 212. The first voltage output 216 is generated by adding a starting value ($V_{start}$) for the first voltage input to the difference multiplied by the gain factor. In one embodiment, other forms of predefined functions are also contemplated, all of which result in the first voltage output 216 being varied as a function of changes in the first voltage input 212.

In one embodiment, the second stage component 220 receives the first voltage output 216 and a second control input 222 and generates an AC output 224, which provides power to the load 290. The second control input 222, which is generated by the controller component 230, is indicative of the power provided to the load 290. The value of the first voltage output 216 received by the second stage component 220 is variable and dependent on the first voltage input 212 and a duty cycle of the first stage component 210.

In one embodiment, the second stage component 220 includes a transformer device having a primary section 226 electro-magnetically coupled to a secondary section 228. The primary section 226 is electrically coupled to the plurality of the switches 225. A primary current flows through the primary section 226 through a center tap 221. The secondary section 228 is coupled in parallel to a second capacitor 223 and the load 290. A secondary current, which is also the load current, flows through the secondary section 228. In one embodiment, the load 290 is the CCFL.

The control component 230 is operable to receive a feedback input 232 indicative of the power required by the load 290 and generate a plurality of control signals 234 for controlling the plurality of switches 225 and switch 215. In one embodiment, the plurality of control signals 234 includes the first and second control inputs 214 and 222. In one embodiment, the feedback input 232 is indicative of the power required by the load 290. Receiving the feedback input 232 may include receiving measurement values for voltage 294 and/or current 296 (through R 298) provided to the load 290.

In one embodiment, the plurality of switches 225 respectively includes first and second switches 227 and 229. In this embodiment, the first and second switches 227 and 229 have the same duty cycle but operate at a 180 degree phase shift. The plurality of switches 250 control the flow of current from the first voltage output 216 received from the first stage component 210 to the primary section 226. The plurality of switches 250 thus control the magnitude and direction of the primary current and hence the secondary current and the current flowing through the load 290.

In one embodiment, each control signal included in the plurality of control signals 234 controls a corresponding switch included in the plurality of switches 225 and the switch 215. Each control signal controls the corresponding control switch by placing it in an ON or OFF state, and by controlling a time period during which the corresponding switch remains in the ON or OFF state. That is, each control signal controls a duty cycle of the first and second stage components 210 and 220. In one embodiment, each of the plurality of switches 250 and the switch 215 is a MOSFET device.

The plurality of switches 250 may be configured in a variety of configurations such as half-bridge-and full-bridge. In the depicted embodiment, the plurality of switches is configured as a push-pull circuit that includes the two switches 227 and 229. In one embodiment, the plurality of control signals 234 may include two control signals operable to control the corresponding two switches. In the depicted embodiment, the plurality of control signals 234 includes the second control signal 222 to control the operation of the first switch 227, with a complementary version (not shown) of the second control signal 222 controlling the operation of the second switch 229. The controller component 230 may operate the plurality of switches 250 and the switch 215 at a variable or fixed frequency such as 60 KHz. In one embodiment, the controller component 230 may operate the plurality of switches 250 and the switch 215 at a variable or fixed but different frequency.

Figure 3A:
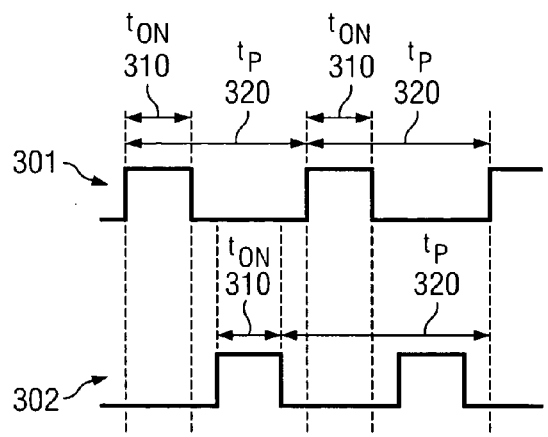
FIG. 3A illustrates waveforms associated with the operation of the first and second switches of FIG. 2, according to an embodiment.

FIG. 3A illustrates waveforms 301 and 302 associated with the operation of the first and second switches 227 and 229 respectively, according to an embodiment. In waveform 301, the amount of power provided to the load 290 is adjusted by an amount of time $t_{ON}$ 310 the first switch 227 is placed in an ON state. That is, by increasing the duty cycle (computed as a ratio of $t_{ON}$ 310 to $t_P$ 320) the amount of power provided to the load 290 is increased and vice versa. The second switch 229 has the same $t_{ON}$ 310 and operates at a 180 degree phase shift relative to the first switch 227, as shown in waveform 302. Thus, a maximum value for the duty cycle is 50%.

Figure 3B:
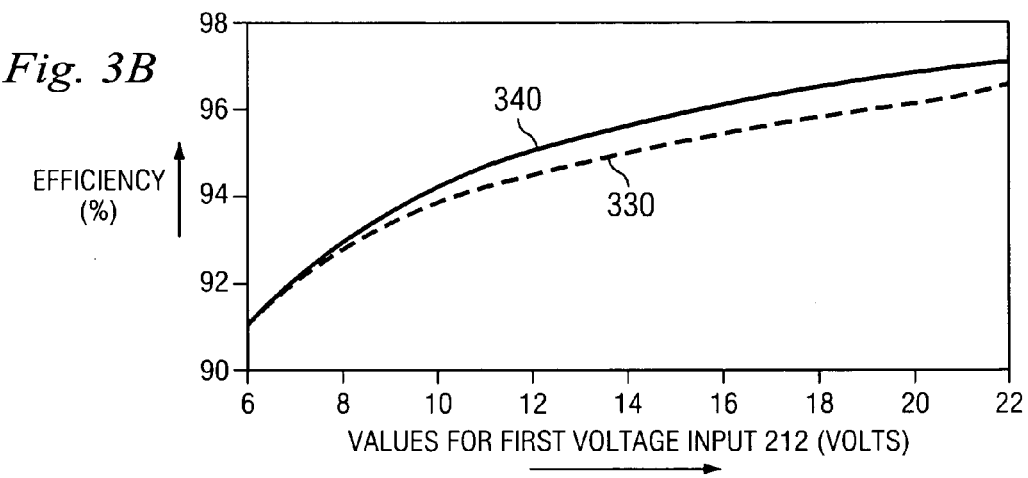
FIG. 3B illustrates a graphical relationship between efficiency of the first stage component and the first voltage input of FIG. 2, according to an embodiment.

FIG. 3B illustrates a graphical relationship between the efficiency of the first stage component 210 (shown on the Y-axis) and values of the first voltage input 212 (shown on the X-axis), according to one embodiment. In the depicted embodiment, a first efficiency graph 330 illustrates first stage efficiency of a commercially available two stage inverter such as the inverter 100 (shown on the Y-axis) plotted against varying values of the first voltage input 212 (shown on the X-axis). On the same graph, a second efficiency graph 340 illustrates first stage efficiency of the improved two stage inverter 200 (shown on the Y-axis) plotted against varying values of the first voltage input 212 (shown on the X-axis). Thus, the improved two stage inverter 200 advantageously delivers a higher first stage efficiency when compared to the commercially available two stage inverter (represented by an area between graphs 330 and 340).

Figure 3C:
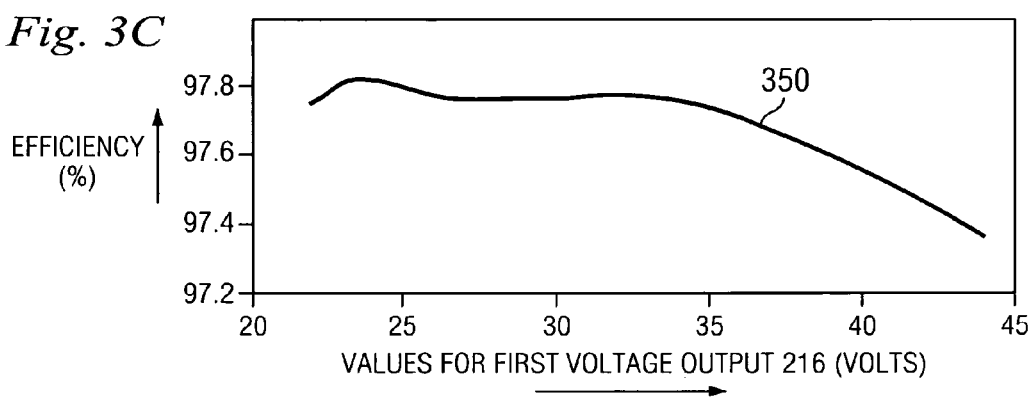
FIG. 3C illustrates a graphical relationship between efficiency of the second stage component and the first voltage output of FIG. 2, according to an embodiment.

FIG. 3C illustrates a graphical relationship between the efficiency of the second stage component 220 (shown on the Y-axis) and the first voltage output 216 (shown on the X-axis), according to one embodiment. In the depicted embodiment, an efficiency graph 350 illustrates the efficiency of the improved two stage inverter 200 (shown on the Y-axis) plotted against varying values of the first voltage output 216 (shown on the X-axis). Thus, by varying values of the first voltage output 216 between a minimum and a maximum range, the improved two stage inverter 200 advantageously delivers a higher efficiency when compared to the commercially available two stage inverter 100 maintaining a substantially constant value of the output of the first stage DC—DC booster.

Figure 3D:
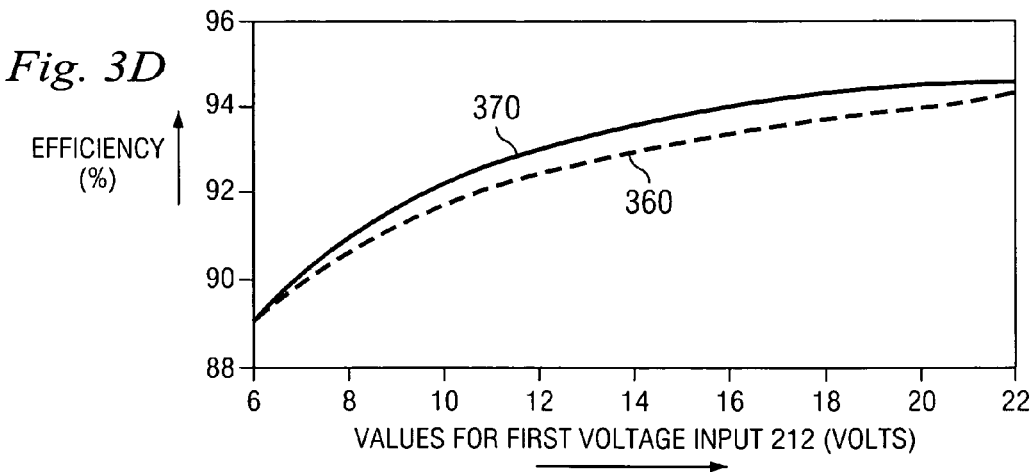
FIG. 3D illustrates a graphical relationship between overall efficiency of the improved two stage inverter and the first voltage output of FIG. 2, according to an embodiment.

FIG. 3D illustrates a graphical relationship between the overall efficiency of the improved two stage inverter 200 (shown on the Y-axis) and the first voltage output 216 (shown on the X-axis), according to one embodiment. In the depicted embodiment, a first efficiency graph 360 illustrates the efficiency of a commercially available two stage inverter such as the inverter 100 (shown on the Y-axis) plotted against varying values of the first voltage input 212 (shown on the X-axis). On the same graph, a second efficiency graph 370 illustrates the efficiency of the improved two stage inverter 200 (shown on the Y-axis) plotted against varying values of the first voltage input 212 (shown on the X-axis). Thus, the improved two stage inverter 200 advantageously delivers a higher efficiency when compared to the commercially available two stage inverter 100.

Figure 4:
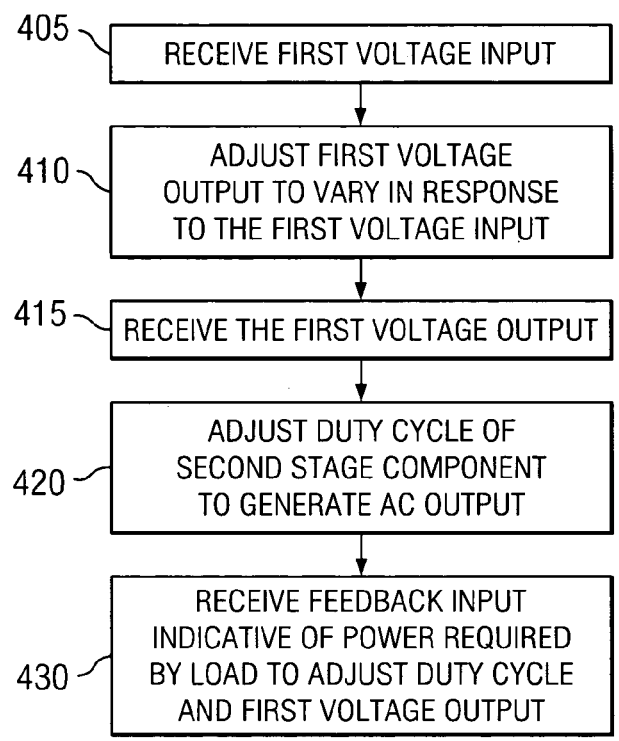
FIG. 4 is a flow chart illustrating a method for improving efficiency of the two stage inverter of FIG. 2 providing power to the load, according to an embodiment.

FIG. 4 is a flow chart illustrating a method for improving the efficiency of the two stage inverter 200 providing power to the load 290, according to an embodiment. In step 405, a DC input, e.g., the first voltage input 212 is received. In step 410, a DC output, e.g., the first voltage output 216, of the first stage component 210 is adjusted to vary in response to receiving the DC input. In step 415, the DC output is received. In step 420, a duty cycle of the second stage component 220 is adjusted to generate an AC output, e.g., the AC output 224, in response to receiving the DC output. The AC output 224 provides power to the load 290. In step 430, a feedback input, e.g., the feedback input 232, which is indicative of the AC output 224, is received to adjust the DC output and the duty cycle.

Various steps described above may be added, omitted, combined, altered, or performed in different orders. For example, in one embodiment, steps 405 and 415 may be combined with steps 410 and 420 respectively.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, the IHS may be a personal computer, including notebook computers, personal digital assistants, cellular phones, gaming consoles, a network storage device, or any other suitable device and may vary in size, shape, performance, functionality, and price.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, and a video display. The IHS may also include one or more buses operable to transmit communications between the various hardware components.

Figure 5:
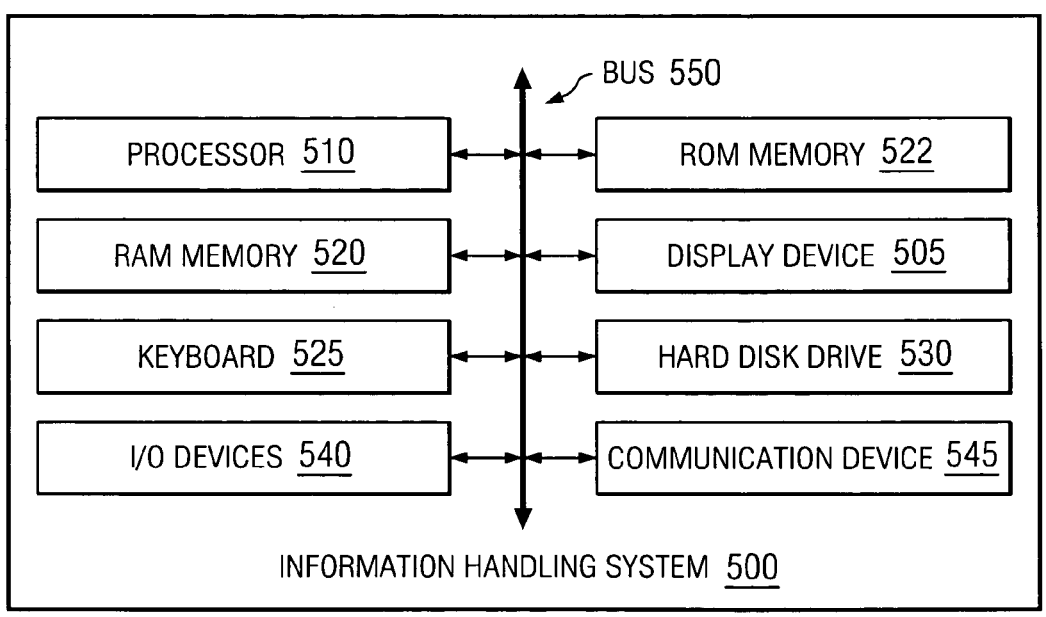
FIG. 5 illustrates a block diagram of an information handling system having an improved two stage inverter, according to an embodiment.

FIG. 5 illustrates a block diagram of an information handling system 500 having an improved two stage inverter, according to an embodiment. The information handling system 500 includes a processor 510, a system random access memory (RAM) 520 (also referred to as main memory), a non-volatile ROM 522 memory, a display device 505, a keyboard 525 and an I/O controller 540 for controlling various other input/output devices. It should be understood that the term "information handling system" is intended to encompass any device having a processor that executes instructions from a memory medium. The IHS 500 is shown to include a hard disk drive 530 connected to the processor 510 although some embodiments may not include the hard disk drive 530. The processor 510 communicates with the system components via a bus 550, which includes data, address and control lines. In one embodiment, the IHS 500 may include multiple instances of the bus 550. A communications controller 545, such as a network interface card, may be connected to the bus 550 to enable information exchange between the IHS 500 and other devices (not shown).

In one embodiment, a power supply system (not shown) providing power to the IHS 500 incorporates the improved two stage inverter 200 (not shown) described in FIG. 2. In this embodiment, the display device 505 may include a CCFL representing the load 290. The improved two stage inverter 200 may be configured to provide power to the display device 505.

The processor 510 is operable to execute the computing instructions and/or operations of the IHS 500. The memory medium, e.g., RAM 520, preferably stores instructions (also known as a "software program") for implementing various embodiments of a method in accordance with the present disclosure. In various embodiments the one or more software programs are implemented in various ways, including procedure-based techniques, component-based techniques, and/or object-oriented techniques, among others. Specific examples include assembler, C, XML, C++ objects, Java and Microsoft Foundation Classes (MFC).

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An inverter for providing power to a load, the inverter comprising:
  a first stage component operable to receive a first voltage input and a first control input to generate a first voltage output higher than the first voltage input, wherein the first control input is indicative of the power provided to the load, wherein the first voltage output varies in response to a change in the first voltage input by a predefined function;
  a second stage component operable to receive the first voltage output and a second control input to generate the power, wherein the second control input is indicative of the power provided to the load;
  a controller component operable to receive a feedback input indicative of the power required by the load and generate the first and second control inputs to the first and second stage components, respectively; and
  the first control input provided to adjust a duty cycle of the first stage component to vary the first voltage output in response to power required by the load, and the second control input, generated by the controller component, is indicative of power provided to the load.

2. The inverter of claim 1, wherein the first stage component is a DC—DC booster converter.

3. The inverter of claim 1, wherein the predefined function computes a difference between the first voltage input and a minimum voltage value of the first voltage input.

4. The inverter of claim 3, wherein the first voltage output is generated by adding a starting value for the first voltage input to the difference multiplied by a gain factor.

5. The inverter of claim 1, wherein the load is a cold cathode fluorescent lamp (CCFL).

6. The inverter of claim 1, wherein the second control input adjusts a duty cycle of the second stage component operating at a predefined frequency in response to the power required by the load.

7. The inverter of claim 6, wherein the duty cycle increases as the power increases.

8. The inverter of claim 1, wherein the first control input adjusts a duty cycle of the first stage component operating at a predefined frequency in response to the power required by the load.

9. The inverter of claim 8, wherein the duty cycle increases as the power increases.

10. An information handling system (IHS) comprising:
  a display device;
  a two stage inverter operable to provide power to the display device, the inverter including:
    a first stage component operable to receive a first voltage input and a first control input to generate a first voltage output higher than the first voltage input, wherein the first control input is indicative of the power provided to the display device, wherein the first voltage output varies in response to a change in the first voltage input by a predefined function; and
    a second stage component operable to receive the first voltage output and a second control input to generate the power, wherein the second control input is indicative of the power;
  a controller component operable to receive a feedback input indicative of the power required by the display device and generate the first and second control inputs to the first and second stage components, respectively; and the first control input provided to adjust a duty cycle of the first stage component to vary the first voltage output in response to power required by the load, and the second control input, generated by the controller component, is indicative of power provided to the load.

11. The system of claim 10, wherein the display device includes a cold cathode fluorescent lamp (CCFL).

12. The system of claim 10, wherein the predefined function computes a difference between the first voltage input and a minimum voltage value of the first voltage input.

13. The system of claim 10, wherein the second control input adjusts a duty cycle of the second stage component operating at a predefined frequency in response to the power required by the display device.

14. The system of claim 13, wherein the duty cycle is adjusted to a value of 50 percent at most.

15. The system of claim 10, wherein the first control input adjusts a duty cycle of the first stage component operating at a predefined frequency in response to the power required by the display device.

* * * * *